Figure 1:
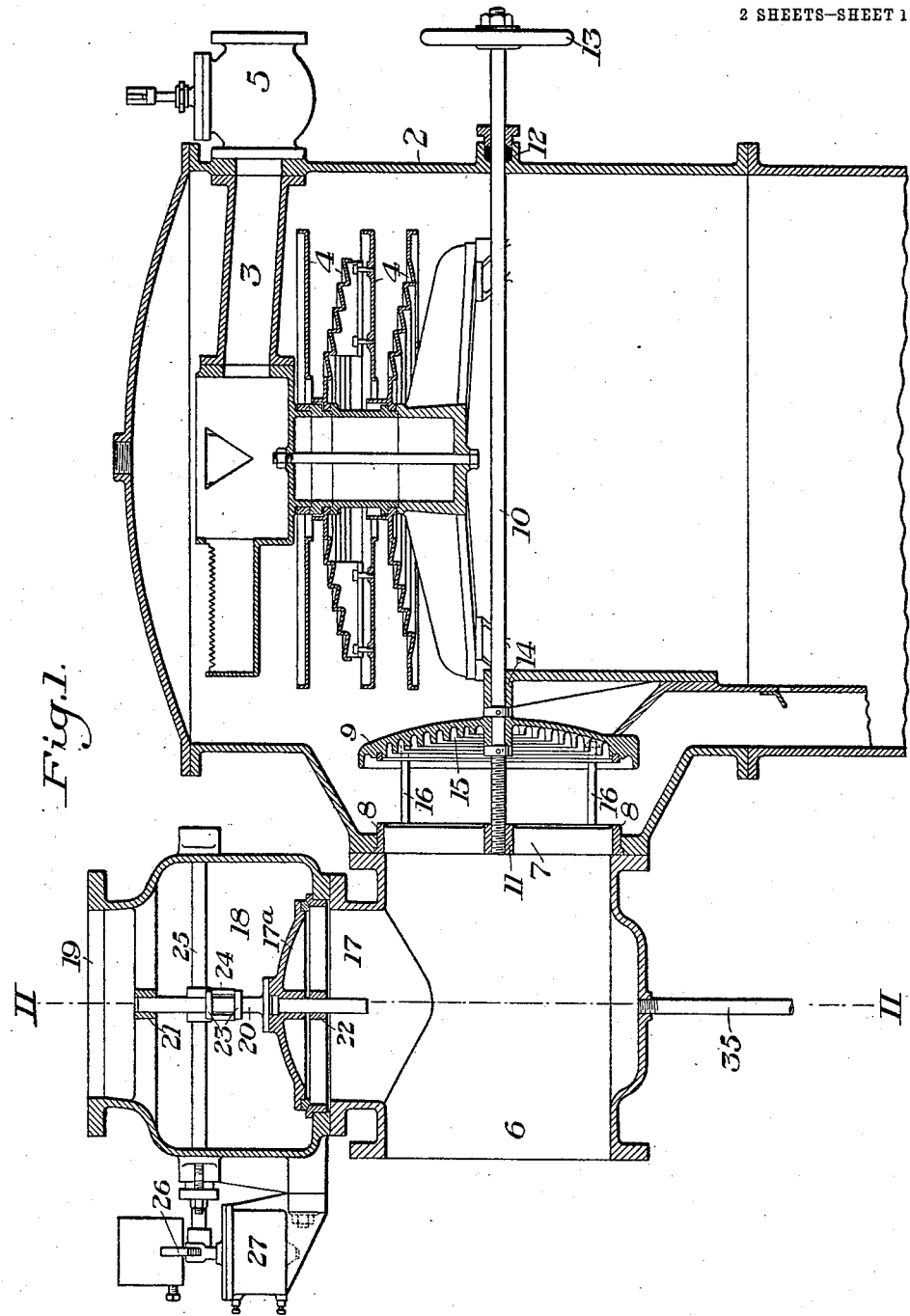

W. S. ELLIOTT.
HEATER.
APPLICATION FILED MAY 27, 1912.

1,073,109.

Patented Sept. 16, 1913.

2 SHEETS—SHEET 1.

WITNESSES
R. A. Balderson
G. B. Fleming

INVENTOR
Wm. S. Elliott,
by
Bakewell, Byrnes Parmelee.
Attys.

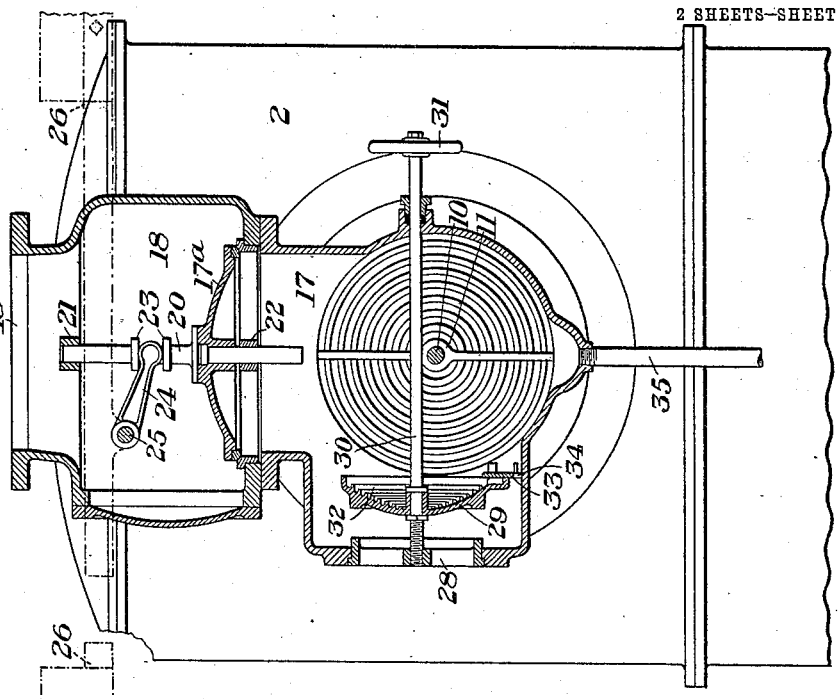
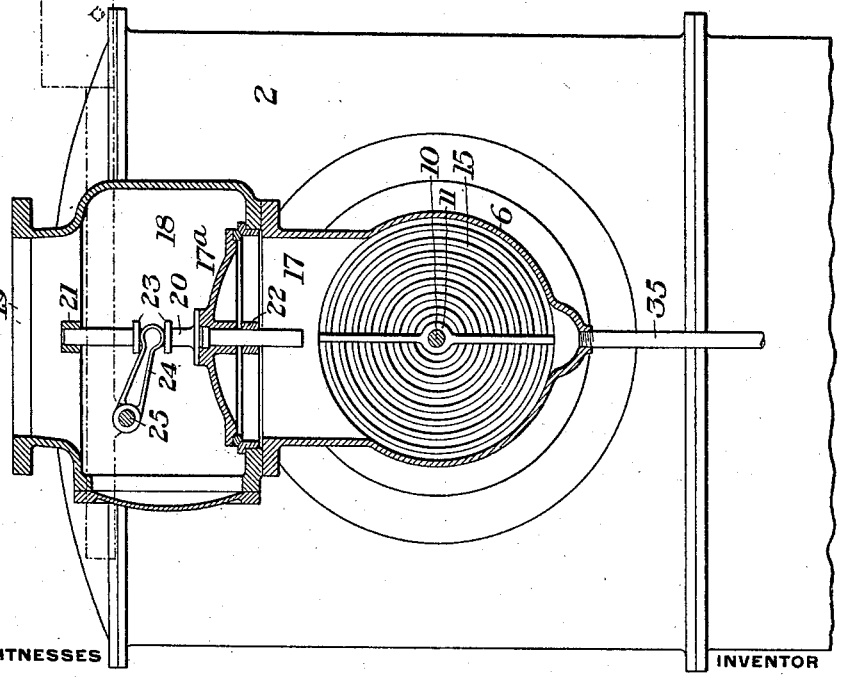

UNITED STATES PATENT OFFICE.

WILLIAM S. ELLIOTT, OF PITTSBURGH, PENNSYLVANIA.

HEATER.

1,073,109.  Specification of Letters Patent.  Patented Sept. 16, 1913.

Application filed May 27, 1912. Serial No. 699,882.

*To all whom it may concern:*

Be it known that I, WILLIAM S. ELLIOTT, a resident of Pittsburgh, Allegheny county, Pennsylvania, have invented a new and useful Improvement in Heaters, of which the following is a full, clear, and exact description, reference being had to the accompanying drawings, forming part of this specification, in which—

Figure 1 is a vertical section of one form of heater embodying my invention; Fig. 2 is a section taken on the line II—II of Fig. 1; and Fig. 3 is a view similar to Fig. 2 but illustrating a modification of the invention.

My invention has relation to the class of heaters, and more especially to feed water heaters, in which feed water is heated by the action of exhaust steam, although it may be used for other purposes.

The object of my invention is to provide a heater of this character having a simple and efficient means whereby the pressure of steam within the heating chamber may be automatically maintained at the desired degree at all times; also to provide means for purifying the steam entering the heater, and also the steam which enters the heating system to which the heater may be connected. In this case, the automatic pressure controlling means for maintaining the desired degree of pressure within the heating chamber also acts to maintain the same degree of pressure within the heating system.

A further object is to provide the controlling means for both the heater and the heating system as a part of the heater, thereby simplifying the apparatus and reducing the cost of its manufacture.

Referring first to Figs. 1 and 2, the numeral 2 designates the body of the heater within the upper portion of which is located a suitable water distributer 3, and pans or distributing plates 4, water being admitted to the distributer 3 through the connection indicated at 5. 6 designates the steam inlet connection for the heater, this connection being preferably formed as a separate casting, which is bolted to the body 2 over the inlet opening 7 thereof, the latter being provided with the valve-seating member 8. 9 is a combined valve and oil-separating plate, which controls the opening 7, and which is carried by a shaft 10 extending through the heating chamber and provided with a bearing 11 at one end in the valve seating member 8, and with a suitable bearing 12 in the opposite wall of the heater, through which it projects, being provided with a hand wheel 13, or other suitable operating device at its outer end. The shaft 10 also has an intermediate support at 14. The face of the valve plate 9, which is opposed to the entering steam, is preferably provided with a plurality of corrugations or projections 15, in order to more effectively act as a separator for the oil contained in the entering steam. In order to more effectively support the valve and separator plate, which is of relatively large diameter, and which is subject to the impact of the entering steam, I provide the supporting and guiding bolts 16, which are carried by the body portion 2, and which extend inwardly through openings in the valve plate, their inner ends being provided with suitable heads which act as stops for the valve in its unseating movement. The steam inlet connection 6 is also provided with relief port 17, which is controlled by a valve 17$^a$ seated within a chamber 18 forming an extension of the member 6, and which chamber communicates with the atmosphere or any other desired point through the opening 19. The valve 17$^a$ is carried by the stem 20, having the guides 21 and 22, and collars 23, the latter being engaged by a crank arm 24 on a shaft 25 journaled in the walls of the extension, and having an adjustable counterweighted arm 26. I preferably also attach to the arm 26 the dash pot device, indicated at 27, to prevent chatter or slamming of the valve 17$^a$.

Should there be an excess of steam pressure in the exhaust line to which the inlet connection 6 is attached, and which would thereby create an excess pressure within the heater, the valve 17$^a$ (which by adjustment of the counter-weighted arm may be set to open at any desired pressure), will unseat, and thereby permit the excess steam to rise to the atmosphere or other point of escape. In this manner the pressure within the heater can be automatically kept at the desired degree at all times.

The construction shown in Fig. 3 is similar to that shown in Figs. 1 and 2, except that the inlet connection 6 is shown as also having an outlet opening 28, which may be connected to a heating system or other apparatus using exhaust steam supplied by the same line as the heater. The opening 28 is controlled by a combined valve and oil separating plate 29, which is within the connection 6, and which is carried by a shaft 30 extending out through one side of said connection and provided with a hand wheel or other actuating device 31. This valve member 29 is shown as having a ribbed or corrugated rear face 32, these corrugations being provided for the same purpose as the corrugations or ribs 15 on the valve member 9, namely, to enable said member to act more efficiently as an oil separator. In order to prevent the passage of any objectionable amount of steam underneath the valve member 29, and thereby carry water into the heating system or other apparatus, I provide suitable means, such as the guard or baffle plate 33. This guard or baffle plate is provided with one or more openings or perforations 34 to permit water to pass therethrough and thence to the drain pipe 35. In this form of my invention, it will be noted that the relief valve 17ᵃ is common to both the heater and to the heating system or other piece of apparatus; and that, therefore, the pressure in both the heater and the heating system will be simultaneously automatically controlled by the operation of said valve. The valve members 9 and 29 being independently operable, steam can at any time be entirely cut off from either the heater or heating system or from both, as may be desired, thus giving complete control.

The described apparatus is extremely simple and compact in its construction, all the control parts being combined in one structure and operable from substantially the same point. I thereby eliminate the use of the complicated connections and pipes formerly employed for regulating the amount of steam going respectively into the heater and into the heating system. I also provide means of very simple and effective character whereby the steam is purified of all entrained oil. I do not, however, wish to limit myself to the exact construction and arrangement of the several parts which I have herein shown and described, as it will be obvious that the invention is applicable to heaters differing specifically in character from the one herein shown; and that various changes can be made in the details of the parts without departing from the spirit and scope of my invention as set forth in the appended claims.

What I claim is:—

1. A heater having an inlet connection forming a structural part thereof, a combined valve and oil separating plate controlling the passage of steam from the connection to the heater, the connection having a relief port, a relief valve for controlling the relief port, and means for causing said valve to open at a predetermined pressure; substantially as described.

2. A feed water heater having an inlet connection, a combined valve and oil separating plate controlling the communication between the inlet connection and the heater, the inlet connection having a relief valve, and means for causing said valve to automatically open upon a predetermined pressure within the heater; substantially as described.

3. A feed water heater having an inlet connection, a combined valve and oil separating plate controlling the communication between the inlet connection and the heater, the inlet connection having a relief valve, and an adjustable counterweight connected to said valve; substantially as described.

4. A feed water heater having an inlet connection, a combined valve and oil separating plate controlling the communication between the inlet connection and the heater, the inlet connection having a relief valve, and an adjustable counterweight and dash pot device connected to said valve; substantially as described.

5. A heater having a steam inlet opening, a combined valve and separator plate within the heater for controlling said opening, a shaft for actuating said plate, and means independent of the shaft for supporting the plate; substantially as described.

6. A heater having a steam inlet opening, a combined valve and separator plate within the heater for controlling said opening, a shaft for actuating said plate, and means independent of the shaft for supporting the plate, the independent supporting means also forming guides for the plate; substantially as described.

7. A heater having a steam admission opening, a combined valve and separator plate within the heater for controlling the opening, an actuating shaft for said plate, and a plurality of guiding or supporting members for said plate; substantially as described.

8. A heater having a steam admission opening, a combined valve and separator plate for controlling said opening, and means for automatically preventing the pressure from exceeding a predetermined amount; substantially as described.

9. A heater having an inlet member attached thereto, said inlet member having a port adapted to convey steam to another steam-using apparatus, and a valve member within the inlet member, said valve member having a seating face and also forming a steam separator, substantially as described.

10. A heater having an inlet member attached thereto, said inlet member having a port adapted to convey steam to another steam-using apparatus, and a valve member within said inlet member, said valve member having a seating face at one side and also acting as a steam separator, together with means for substantially preventing steam from passing below said valve, substantially as described.

11. A heater having an inlet member attached thereto, said inlet member having a port leading into the heater and another port communicating with another steam-using apparatus, and combined valve and separator plates controlling said ports; substantially as described.

12. A heater having an inlet member attached thereto, said inlet member having a port leading into the heater and another port communicating with another steam-using apparatus, and combined valve and separator plates controlling said ports, together with means for automatically controlling the steam pressure in both the heater and the other apparatus; substantially as described.

13. A heater having an inlet member attached thereto, said inlet member having a port adapted to convey steam to another steam-using apparatus, and a valve member within said inlet member, said valve member having a seating face at one side and a separating face at the opposite side; substantially as described.

14. A heater having an inlet member attached thereto, said inlet member having a port adapted to convey steam to another steam-using apparatus, and a valve member within said inlet member, said valve member having a seating face at one side and a separating face at the opposite side, together with means for substantially preventing steam from passing below said valve; substantially as described.

In testimony whereof, I have hereunto set my hand.

WILLIAM S. ELLIOTT.

Witnesses:
GEO. H. PARMELEE,
H. M. CORWIN.